Sept. 27, 1966 S. R. POLLACK 3,275,905
THIN FILM TETRODE
Filed May 31, 1963
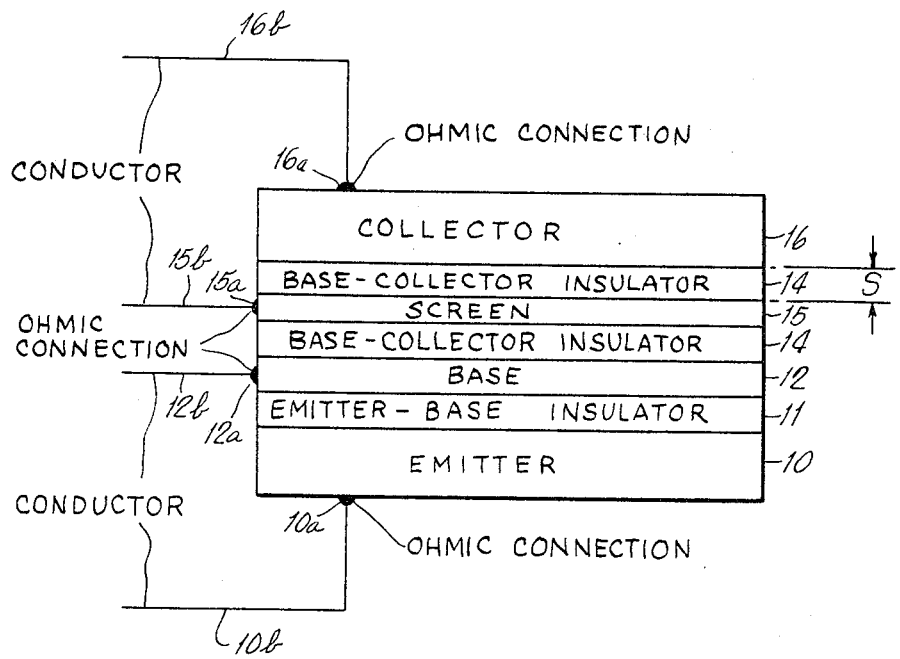
INVENTOR.
SOLOMON R. POLLACK
BY
Thomas F. Moran
ATTORNEY

3,275,905
THIN FILM TETRODE
Solomon R. Pollack, Philadelphia, Pa., assignor to Sperry Rand Corporation, New York, N.Y., a corporation of Delaware
Filed May 31, 1963, Ser. No. 284,607
11 Claims. (Cl. 317—234)

This invention relates to a thin film device. More particularly, this invention relates to a thin film structure useful in thin film tunnel emission devices, such as a thin film tunnel emission triode.

Tunnel emission is the phenomenon occurring at a metal-insulator interface when a high electric field is present within the insulator. Considering a thin film diode structure consisting of two metal films separated by a thin insulating film with a potential being applied between the two metal films, when the electric field is increased to a sufficiently high value, electrons in the metal impinging upon the interface may "tunnel" through the insulator forbidden region into the conduction band.

Various thin film devices employing in operation the tunnel emission phenomenon have been proposed, such as a thin film diode and a thin film triode. In a thin film tunnel emission diode a relatively thin film of insulating material having a thickness of approximately 10 to 50 A. is disposed between two electrically conductive metallic films. In a thin film tunnel emission triode a relatively thin insulating film, such as a film having a thickness of approximately 10 to 50 A., separates two electrically conductive metallic films, a so-called emitter and a so-called base. Another film of insulating material is disposed in contact with the base and between the base and another electrically conductive metallic film known as the collector.

In a thin film tunnel emission triode it has been found that the frequency and the output level available are limited by the feedback effects of the capacitance existing between the base and collector of the triode.

It is an object of this invention to provide a thin film structure useful in thin film devices, particularly thin film devices based on the tunnel emission phenomenon.

Another object of this invention is to provide a thin film structure useful for incorporation in thin film tunnel emission tetrodes to improve the operational capabilities of these tetrodes.

It is another object of this invention to provide an improved thin film tunnel emission tetrode.

Another object of this invention is to provide a method and a thin film device useful for reducing the base-collector capacitance in a thin film tunnel emission triode.

Still another object of this invention is to provide a novel thin film device, particularly a novel thin film tunnel emission device.

How these and other objects of this invention are achieved will become apparent in the light of the accompanying disclosure and with reference to the accompanying drawing which schematically illustrates a thin film tunnel emission device in accordance with one embodiment of this invention.

In accordance with this invention there is provided a thin film device useful for incorporation in a thin film tunnel emission device, such as a thin film tunnel emission triode, to improve the operational capabilities of the thin film tunnel emission triode. The thin film device in accordance with this invention comprises a porous, electrically continuous grid-like film of electrically conductive material and a film of electrically insulating material disposed in contact with both sides of said grid-like film. Accordingly, there is provided a thin film device comprising a film of electrically insulating material and a porous or foraminous, continuous film of electrically conductive material imbedded or sandwiched within said film of electrically insulating material.

In accordance with a specific embodiment of this invention an improved thin film tunnel emission triode comprising an emitter, a base and a collector, each being made up of electrically conductive material and separated from each other by electrically insulating material, is provided by disposing a porous, electrically continuous film of electrically conductive material within the insulating material separating the base and the collector. By maintaining the porous film of electrically conductive material at a suitable voltage in the operation of such a thin film tunnel emission triode, this film serves to 'screen" the collector from the base thereby decreasing the base-collector capacitance.

For a better understanding of this invention and illustrative of the practice thereof, reference is made to the accompanying drawing which illustrates this invention as embodied in a thin film tunnel emission triode which might also be referred to as a thin film tunnel emission tetrode.

In the thin film device illustrated in the drawing, a film of electrically conductive material, such as a film of electrically conductive metal, e.g. aluminum, identified as emitter 10 deposited on a suitable inert substrate, not shown, having a suitable thickness greater than about 1000 A., such as a thickness in the range 1000–10,000 A., more or less, is disposed in contact with a thin film of electrically insulating material, such as aluminum oxide, referred to as emitter-base insulator 11. The thickness of emitter-base insulator 11 is thin as compared with the thickness of emitter 10. Desirably, the thickness of emitter-base insulator 11 is approximately 10 to 50 A.

Disposed in contact with emitter-base insulator 11 is a film of electrically conductive material, such as a film of electrically conductive metal, e.g. aluminum, identified as base 12. Desirably, the thickness of base 12 is relatively thin compared with an electron mean free path in the metal, such as a thickness in the range 100–300 A., more or less.

A film of electrically insulating material referred to as base-collector insulator 14 is disposed in contact with base 12. Aluminum oxide is a suitable material for base-collector insulator 14. Imbedded or sandwiched within base-collector insulator 14 is a porous, electrically continuous film of electrically conductive material, such as a film of electrically conductive metal, e.g. gold or aluminum, identified as screen 15. Porous, grid-like screen 15 is electrically continuous and presents holes or openings therethrough for the movement of electrons therethrough. Grid-like screen 15 may readily be formed by vapor deposition of a metal, such as gold, as a thin film. Desirably, the pores or openings in screen 15 make up a substantial amount, preferably a major amount, such as an amount in the range 30–80%, of the surface area of screen 15. The overall thickness of base-collector insulator 14, including screen 15 embedded or sandwiched therein, is greater than 50 A., such as a thickness in the range 100–300 A. Desirably, the thickness of base-collector insulator 14 on either side of screen 15 is greater than 25 A. The position of the grid or screen in the base-collector insulator will alter the properties of the device, e.g. the grid or screen collector capacitance will essentially be proportional to 1/S where S is the grid to collector distance. The position of the grid may also affect the collector collection efficiency and this efficiency will also depend upon S and the grid bias.

A relatively thick film of electrically conductive material, such as a film of electrically conductive metal, e.g. aluminum or gold, identified as collector 16, is disposed in contact with base-collector insulator 14. The thickness of collector 16 is usually upwards of 1000 A., such as about 10,000 A.

As illustrated, ohmic connections 10a, 12a, 15a, 16a provided with conductors 10b, 12b, 15b and 16b are provided attached to emitter 10, base 12, screen 15 and collector 16, respectively. Suitable means, not shown, are provided for applying and/or maintaining a voltage or desired potential to emitter 10, base 12, screen 15 and collector 16 via conductors 10b, 12b, 15b and 16b, respectively.

In the operation of the thin film device illustrated in the drawing, upon the application of a suitable voltage differential between emitter 10 and base 12 across emitter-base insulator 11, electron flow due to tunnel emission occurs at the emitter-base insulator interface. The electrons pass through emitter-base insulator 11 and through base 12 into base-collector insulator 14. By maintaining screen 15 at a suitable voltage, screen 15 serves to screen collector 16 from base 12, thereby decreasing base-collector capacitance while at the same time the pores or openings within screen 15 permit a large amount of the electrons generated by the tunnel emission phenomenon to flow through screen 15 to collector 16.

Various electrically conductive materials, particularly the electrically conductive metals, may be employed in the practice of this invention to make up the emitter, base and collector components. In this connection reference is made to the article by C. A. Mead entitled, "Operation of Tunnel-Emission Devices," published in Journal of Applied Physics, vol. 32, No. 4, pages 646–652 (1961) and U.S. Patent 3,056,073 issued September 25, 1962, to C. A. Mead. The disclosure of these publications are herein incorporated and made part of this disclosure. Suitable electrically conductive materials useful in the fabrication of the emitter, base and/or collector in accordance with this invention include aluminum, gold, tantalum, chromium, nickel, platinum, tungsten and the various other electrically conductive metals. Suitable materials for making up the electrically insulating components, viz. the emitter-base insulator and the base-insulator components of this invention include the electrically insulating oxides of aluminum, lead zinc, tantalum, beryllium, tungsten and the various other metals, as well as the other electrically insulating compounds, such as the halides, e.g. fluorides, and sulfides, of these metals.

Specific embodiments of the various components, such as the base-collector insulator containing the sandwiched or imbedded screen of porous, electrically continuous, electrically conductive metallic film, include aluminum oxide as the base-collector insulator containing imbedded therein a porous, electrically continuous gold film or grid as the screen and having an average thickness in the range from about 5–200 A. In another embodiment the base-collector insulator comprises aluminum oxide and the screen comprises metallic aluminum. In still another embodiment the base-collector insulator comprises tantalum oxide and the screen comprises tantalum. In yet another embodiment the base-collector insulator comprises tantalum oxide and the screen comprises gold.

Referring particularly to the drawing, specific embodiments of the illustrated thin film device in accordance with this invention would include the use of aluminum for the emitter, base, screen and collector and aluminum oxide for the emitter-base insulator and the base-collector insulator. Still another embodiment would include the use of tantalum for the emitter and gold for the base, screen and collector and tantalum oxide for the emitter-base insulator and the base-collector insulator. In accordance with another embodiment, the emitter, base and collector is made up of aluminum, the screen of gold and the emitter-base insulator and the base-collector insulator made up of aluminum oxide.

Various techniques well known to those skilled in the art may be employed in the fabrication of the thin film devices in accordance with this invention. These techniques include vaporization and deposition of metallic materials upon a suitable substrate in an inert atmosphere or vacuum for the deposition of the various electrically conductive films. Cathode sputtering, electrodeposition and electroless deposition are also usefully employed. In the laying down of the films of electrically insulating material various techniques, such as wet or dry anodization, may be employed as well as in situ oxidation of a metal, such as aluminum, in the presence of elemental oxygen.

As will be apparent to those skilled in the art in the light of the foregoing disclosure, many substitutions and alterations are possible in the practice of this invention without departing from the spirit or scope thereof.

The embodiments of the invention in which an exclusive property or privilege is claimed are defined as follows:

1. A thin film tunnel emission device comprising a first electrically conductive metallic film, a second electrically insulating film in contact with said first film, a third electrically conductive metallic film in contact with said second film, a fourth electrically insulating film in contact with said third film, a fifth electrically conductive metallic film inserted or sandwiched within said fourth film such that said fifth film is in contact on both sides with said fourth film, a sixth electrically conductive metallic film in contact with said fourth film and an ohmic connection provided to each of said first, third, fifth and sixth electrically conductive metallic films.

2. A thin film tunnel emission device in accordance with claim 1 wherein said first film has a thickness of at least about 1000 A., said second film has a thickness in the range from about 10 A. to about 50 A., said third film has a thickness in the range from about 100 A. to about 300 A., said fourth film, including said fifth film, has an overall thickness in the range from about 50 A. to about 300 A., said fifth film being a porous, electrically continuous film and wherein said sixth film has a thickness of at least about 1000 A.

3. A thin film tunnel emission device in accordance with claim 1 wherein said first and sixth films each have a thickness in the range from about 1000 A. to about 10,000 A., said second film has a thickness in the range 10–50 A., said third film has a thickness in the range from about 100 A. to about 300 A. and wherein said fourth film, including said fifth film, has an overall thickness in the range 100–300 A., said fifth film being a porous, electrically continuous film, the pores of said fifth film making up 30–80% of the surface area of said fifth film.

4. A thin film tunnel emission device in accordance with claim 1 wherein said first, third, fifth and sixth films comprise metallic aluminum and wherein said second and fourth films comprise aluminum oxide.

5. A thin film tunnel emission device in accordance with claim 1 wherein said first film is metallic tantalum, said third, fifth and sixth films comprise metallic gold and wherein said second and fourth films comprise tantalum oxide.

6. A thin film tunnel emission device in accordance with claim 1 wherein said first, third, fifth and sixth metallic films comprise a metal selected from the group consisting of aluminum, tantalum, gold, chromium, nickel, platinum, tungsten and lead.

7. A thin film tunnel emission device in accordance with claim 1 wherein said second and fourth insulating films comprise an electrically insulating compound selected from the group consisting of aluminum oxide, lead oxide, zinc oxide, tantalum oxide, tungsten oxide and beryllium oxide.

8. A thin film tunnel emission device in accordance with claim 1 wherein said first, third, fifth and sixth metallic films comprise a metal selected from the group consisting of aluminum, tantalum, gold, chromium, nickel, platinum, tungsten and lead and wherein said second and fourth insulating films comprise an electrically insulating compound selected from the group consisting of aluminum oxide, lead oxide, zinc oxide, tantalum oxide, tungsten oxide and beryllium oxide.

9. A thin film tunnel emission device in accordance with claim 1 wherein the thickness of said fourth film on each side of said fifth film is greater than about 25 A.

10. A thin film tunnel emission device in accordance with claim 1 wherein said fifth film is a porous electrically continuous or conductive metallic film having a thickness greater than about 5 A.

11. A thin film tunnel emission device in accordance with claim 1 wherein said fifth film is a porous electrically continuous film having an average thickness in the range from about 5 A. to about 200 A.

References Cited by the Examiner

UNITED STATES PATENTS

| 3,056,073 | 9/1962 | Mead | 317—234 |
| 3,116,427 | 12/1963 | Giaever | 307—88.5 |
| 3,197,335 | 7/1965 | Leszynski | 117—212 |

FOREIGN PATENTS 500,342   2/1939   Great Britain.

OTHER REFERENCES

Vacuum Deposition of Thin Films, L. Holland, Chapman and Hall, London, 1956 (pp. 504–508).

JOHN W. HUCKERT, *Primary Examiner.*

M. H. EDLOW, *Assistant Examiner.*